United States Patent [19]
Li et al.

[11] Patent Number: 4,681,917
[45] Date of Patent: Jul. 21, 1987

[54] POLY (VINYL CHLORIDE) COMPOSITIONS

[75] Inventors: George S. Li, Solon; Muyen M. Wu, Hudson; Elmer J. Dewitt, Cuyahoga Falls, all of Ohio

[73] Assignee: The Standard Oil Company, Cleveland, Ohio

[21] Appl. No.: 859,518

[22] Filed: May 5, 1986

[51] Int. Cl.$^4$ .............................................. C08L 27/06
[52] U.S. Cl. .................................................. 525/210
[58] Field of Search ......................... 525/210; 526/280

[56]     References Cited
    U.S. PATENT DOCUMENTS

| | | | |
|---|---|---|---|
| 4,074,038 | 2/1978 | Li | 526/280 |
| 4,117,040 | 9/1978 | Li | 525/210 |
| 4,153,648 | 5/1979 | Li | 525/210 |

*Primary Examiner*—Paul R. Michl
*Attorney, Agent, or Firm*—Charles S. Lynch; John E. Miller; Larry W. Evans

[57]     ABSTRACT

A composition comprising an intimate admixture of (a) 50 to 98 parts by weight of a vinyl chloride polymer having an inherent viscosity of at least 0.4 and (b) 50 to 2 parts by weight of an addition copolymer containing indene and one comonomer selected from acrylonitrile, methyl methacrylate and methacrylonitrile, combined in the polymer structure with indene in the amount of 31.5–70 acrylonitrile, or 37–80 methacrylonitrile, or 46–95 methyl methacrylate, all per 100 parts by weight of indene plus comonomer combined in the polymer structure.

6 Claims, No Drawings

POLY (VINYL CHLORIDE) COMPOSITIONS

This invention relates to poly(vinyl chloride) plastic molding compositions having improved working and performance characteristics, particularly a higher heat distortion temperature (HDT).

Poly(vinyl chloride) resins are well known to be useful to mold many end products such as bottles, film, sheet, pipe, structural moldings. However, the normal poly(vinyl chloride) resin compositions used to make rigid end products have too low a heat distortion temperature for use in applications under heat and load because the shape of the product will become distorted when approaching the heat distortion temperature. For instance, it would be desirable to have poly(vinyl chloride) compositions in the form of pipe and bottles that will stand a higher temperature in service than the standard poly(vinyl chloride) resins having a normal 65 to 70 or 71° C. heat distortion temperature.

It is an object of the present invention to provide rigid poly(vinyl chloride) compositions having improved properties, particularly a higher heat distortion temperature, as well as good flexural modulus and tensile strength, among other mechanical properties.

Other objects, as well as aspects, features and advantages of the present invention, will become apparent from a study of specification, including the examples and the claims.

The objects enumerated above, and other objects, are realized according to the present invention by providing a composition or blend of a vinyl chloride polymer and certain copolymers containing indene as one of the monomers.

The vinyl chloride resin of the blend of the invention can be a homopolymer of vinyl chloride or a copolymer of vinyl chloride with a minor portion of one or more monomers copolymerizable with vinyl chloride. In such copolymers vinyl chloride comprises on a weight basis at least about 80 (preferably at least 90) percent of the copolymer and the copolymerizable monomer comprises up to about 20 (preferably up to about 10) percent. A wide variety of copolymerizable monomers may be used to prepare such vinyl chloride copolymers. These include vinylidene chloride; vinyl acetate and vinyl stearate; acrylic and methacrylic acid esters; olefins such as ethylene, propylene, isobutylene and the like; vinyl alkyl ethers such as vinyl isobutyl ether, vinyl lauryl ether, and vinyl cetyl ether; acrylic acid and methacrylic acid; acrylonitrile and methacrylonitrile; diethyl fumarate; maleic anhydride; dimethyl itaconate; styrene, N-vinyl carbazole; N-vinyl pyrrolidone; or mixtures thereof.

Methods for the preparation of vinyl chloride polymers are well known in the art and reported in the literature. See for example *Kirk-Othmer, Encyclopedia of Chemical Technology*, Third Edition, Interscience Publishers, Volume 23, pages 886–936, (Copyright 1983), the disclosures of which is incorporated herein by reference. Vinyl chloride polymers are available from a number of commercial suppliers. For preparing blends of this invention for use in injection molding operations, the vinyl chloride polymer usually has an inherent viscosity (as measured at a concentration of 0.5 gram per 100 grams of cyclohexanone at 25° C.) in the range of about 0.40 to about 0.70 and more usually in the range of about 0.50 to 0.70. Blends of such injection molding grade poly(vinyl chloride) homopolymer with our copolymers are particularly useful. Blends of the copolymers with extrusion grade vinyl chloride polymers are also very useful, and the extrusion grade vinyl chloride polymers used in such blends generally have viscosities in the inherent viscosity range from over 0.70 to 1.2, measured on the same basis. The present blends usually use a vinyl chloride polymer having an inherent viscosity of 0.54 to 1.

The copolymers used in the blends of the present invention are polymers that are the result of addition polymerization of indene with one of the monomers acrylonitrile, methyl methacrylate, or methacrylonitrile. They are normally solid and have inherent viscosities of at least 0.8 measured for a solution of 0.2 gm. of the polymer in 100 cc of dimethylformamide at 25° C.

As used herein inherent viscosity is in deciliters per gram of polymer composition.

According to the present invention there is provided a composition comprising an intimate admixture of (a) 50 to 98 parts by weight of a vinyl chloride polymer having an inherent viscosity of at least 0.4 and (b) 50 to 2 parts by weight of an addition copolymer containing indene and comonomer selected from acrylonitrile, methyl methacrylate and methacrylonitrile, combined in the polymer structure with indene in the amount of 31.5–70 acrylonitrile, or 37–80 methacrylonitrile, or 46–95 methyl methacrylate, all per 100 parts by weight of indene plus said comonomer combined in the polymer structure.

It is also optional that the present copolymers contain, per 100 weight parts of the combined indene and said comonomer, from 0.01 up to 3 weight parts combined in the polymer structure, of a cross-linking agent such as polyunsaturated hydrocarbons, esters, amides, nitriles, acids, sulfones, polyunsaturated acid anhydrides, polyunsaturated ethers such as divinyl ether, diallyl ether, diallyl ethylene glycol ether, the vinyl, allyl, methallyl and crotyl polyethers containing 2 to 7 or more alkenyl ether groups per molecule, polyunsaturated ketones such as divinyl ketone, diallyl ketone, allyl-beta-allyloxy propionate, allyl methacrylyl sucrose, monoallyl maleate, and partial allyl ethers of polyhydric alcohols such as diallyl glycerol ether. Generically, these cross-linking agents are any polymerizable material polymerizable with indene or its comonomer and having a plurality of $CH_2=C<$ groupings.

An especially useful group of such cross-linking polyolefinic monomers in the indene polymers used in the compositions of the present invention includes divinyl benzene, trivinyl benzene, divinyl naphthalene, triallyl cyanurate, methylene-bis-acrylamide, methylene-bis-methacrylamide, triacrylyl triazine, trimethacrylyl triazine, hexaallyl trimethylene trisulfone, tetraallylmethane, tetrabutenyl methane, tetraallyl silane, tetravinyl silane, tetraallyl germane, tetravinyl germane, ethylene glycol diacrylate, pentaerythritol tetraacrylate, allyl acrylate, allyl cinnamate, diallyl maleate, diallyl phthalate, divinyl ether, diallyl ether, 3,9-divinyl-2,4,8,10-tetraoxospiro[5,5]undecane, divinyl ketone, polyalkenyl polyethers of polyhydric alcohols such as polyallyl sucrose, tetraallyl pentaerythritol, and the like.

The vinyl chloride polymer compositions of this invention can include other ingredients, such as impact modifiers, thermal stabilizers, processing aids, fillers, lubricants, pigments, flame retardants, reinforcing fibers, smoke retardants, antioxidants, and the like.

The compositions of this invention can include other ingredients, such as impact modifiers, thermal stabilizers, processing aids, fillers, lubricants, pigments, flame retardants, reinforcing fibers, smoke retardants, antioxidants, and the like.

The vinyl chloride polymer compositions of this invention can also contain fillers Examples are calcium carbonate, wollastonite, silicates such as talc, acicular calcium silicate, titanium dioxide, potassium titanate, and glass flakes. Amounts of such fillers are up to about 50 parts per 100 parts of the combined vinyl chloride polymer plus the copolymer.

In the copolymer compositions forming the additive component of our invention, we have found that the indene component increases the HDT, while the polar compounds, acrylonitrile and methylacrylate contribute to compatibility with the vinyl chloride polymer, thus helping to maintain other physical mechanical properties.

Properties reported in this application were determined by the procedures of the following ASTM designations:

| Heat Distortion Temperature | ASTM D 648 (264 psi. unannealed) |
| --- | --- |
| Tensile Strength | ASTM D 638(Modified) |
| Flexural Strength | ASTM D 790 |
| Flexural Modulus | ASTM D 790 |
| Melt Index | ASTM D 1238 |

The following examples of the vinyl chloride blend compositions of the invention are merely illustrative and are not to be considered limiting.

In the examples unless otherwise stated, the PVC used in the blends was an injection grade PVC having an inherent viscosity of 0.68 deciliters/gm. for a 0.5 weight percent solution in cyclohexanone, and when stabilized with 3 parts by weight of Thermolite 813 per 100 parts of PVC, the PVC had a tensile strength of 8,500 psi, an HDT of 70° C., a flexural strength of 12,400 psi, a flexural modulus of 430,000 psi, a notched Izod of 0.26 ft-lbs/sq. in., and a melt index of 0.6 grams/10 minutes at 175° C.

In the examples, Thermolite 813 is di-n-octyltin maleate polymer sold by M & T Chemicals Inc. having the formula

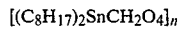

$[(C_8H_{17})_2SnCH_2O_4]_n$ having a melting point of 90° C. and specific gravity of 0.6. It is a commonly used thermal stabilizer.

EXAMPLE 1

A copolymer was made by emulsion polymerization according to the following recipe. Amounts are in weight parts per 100 parts of total monomers.

| PHM | Components |
| --- | --- |
| 200 | H$_2$O |
| 3.0 | Sodium lauryl sulfate |
| 1.0 | Na$_2$S$_2$O$_8$ |
| 1.0 | Na$_3$PO$_4$.12H$_2$O |
| 32 | Acrylonitrile |
| 68 | Indene |

The sodium lauryl sulfate and the sodium phosphate were dissolved in water and charged to the reactor. The reactor contents were placed under a nitrogen atmosphere. The reactor was charged with the monomers, and the contents of the reactor were heated to 60° C. and agitated with a mechanical stirrer. Polymerization was initiated by the sodium persulfate and was continued for 24 hours at 60° C.

After completion of the reaction, the polymer was recovered through freeze coagulation of the latex. The polymer was filtered, and was then stirred with excess methanol overnight to remove residual monomers. The polymer was filtered again and dried in a vacuum over for 24 hours at 60° C. The copolymer was obtained in a 58 percent yield. Its composition, as determined by nitrogen analysis, was 34 acrylonitrile, 66 indene in weight percent.

25 parts by weight of the copolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT and other physical properties, as noted below:

The HDT of the blend was 74° C. The melt index of the blend was 1.8 g./10 min at 175° C.

EXAMPLE 2

A copolymer was made by emulsion polymerization according to the following recipe. Amounts are in weight parts per 100 parts of total monomers.

| PHM | Components |
| --- | --- |
| 200 | H$_2$O |
| 3.0 | Sodium lauryl sulfate |
| 1.0 | Na$_2$S$_2$O$_8$ |
| 1.0 | Na$_3$PO$_4$.12H$_2$O |
| 37 | Methacrylonitrile |
| 63 | Indene |

The sodium lauryl sulfate and the sodium phosphate were dissolved in water and charged to the reactor. The reactor contents were placed under a nitrogen atmosphere. The reactor was charged with the monomers, and the contents of the reactor were heated to 60° C. and agitated with a mechanical stirrer. Polymerization was initiated by the sodium persulfate and was continued for 24 hours at 60° C.

After completion of the reaction, the polymer was recovered through freeze coagulation of the latex. The polymer was filtered, and was then stirred with excess methanol overnight to remove residual monomers. The polymer was filtered again and dried in a vacuum over for 24 hours at 60° C. The copolymer was obtained in a 22 percent yield. Its composition, as determined by nitrogen analysis, was 49 methacrylonitrile, 51 indene in weight percent.

25 parts by weight of the copolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT and other physical properties, as noted below:

The HDT of the blend was 71.5° C., the flexural strength was 10,780 psi and the flexural modulus 477,00 psi. The melt index of the blend was 22.4 g./10 min at 195° C.

EXAMPLE 3

A copolymer was made by emulsion polymerization according to the following recipe. Amounts are in weight parts per 100 parts of total monomers.

| PHM | Components |
| --- | --- |
| 200 | $H_2O$ |
| 3.0 | Sodium lauryl sulfate |
| 1.0 | $Na_2S_2O_8$ |
| 1.0 | $Na_3PO_4.12H_2O$ |
| 80 | Methacrylonitrile |
| 20 | Indene |

The sodium lauryl sulfate and the sodium phosphate were dissolved in water and charged to the reactor. The reactor contents were placed under a nitrogen atmosphere. The reactor was charged with the monomers, and the contents of the reactor were heated to 60° C. and agitated with a mechanical stirrer. Polymerization was initiated by the sodium persulfate and was continued for 16 hours at 60° C.

After completion of the reaction, the polymer was recovered through freeze coagulation of the latex. The polymer was filtered, and was then stirred with excess methanol overnight to remove residual monomers. The polymer was filtered again and dried in a vacuum over for 24 hours at 60° C. The copolymer was obtained in a 41 percent yield. Its composition, as determined by nitrogen analysis, was 78 methacrylonitrile, 22 indene in weight percent.

20 parts by weight of the copolymer was mixed with 80 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT and other physical properties, as noted below:

The HDT of the blend was 71.5° C., the tensile strength was 8,470 psi, the flexural strength was 9,030 psi and the flexural modulus 482,000 psi. The melt index of the blend was 6.0 g./10 min at 185° C.

EXAMPLE 4

A copolymer was made by emulsion polymerization according to the following recipe. Amounts are in weight parts per 100 parts of total monomers.

| PHM | Components |
| --- | --- |
| 200 | $H_2O$ |
| 3.0 | Sodium lauryl sulfate |
| 1.0 | $Na_2S_2O_8$ |
| 1.0 | $Na_3PO_4.12H_2O$ |
| 80 | Methy Methacrylate |
| 20 | Indene |

The sodium lauryl sulfate and the sodium phosphate were dissolved in water and charged to the reactor. The reactor contents were placed under a nitrogen atmosphere. The reactor was charged with the monomers, and the contents of the reactor were heated to 60° C. and agitated with a mechanical stirrer. Polymerization was initiated by the sodium persulfate and was continued for 16 hours at 60° C.

After completion of the reaction, the polymer was recovered through freeze coagulation of the latex. The polymer was filtered, and was then stirred with excess methanol overnight to remove residual monomers. The polymer was filtered again and dried in a vacuum over for 24 hours at 60° C. The copolymer was obtained in a 94 percent yield. Its composition, as determined by nitrogen analysis, was 86 methyl methacrylate and 14 indene in weight percent.

20 parts by weight of the copolymer was mixed with 80 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT and other physical properties, as noted below:

The HDT of the blend was 77.5° C., the tensile strength was 10,190 psi, the flexural strength was 13,680 psi and the flexural modulus 388,000 psi. The melt index of the blend was 0.715 g./10 min at 175° C.

EXAMPLE 5

A copolymer was made by emulsion polymerization according to the following recipe. Amounts are in weight parts per 100 parts of total monomers.

| PHM | Components |
| --- | --- |
| 200 | $H_2O$ |
| 3.0 | Sodium lauryl sulfate |
| 1.0 | $Na_2S_2O_8$ |
| 1.0 | $Na_3PO_4.12H_2O$ |
| 46 | Methyl Methacrylate |
| 54 | Indene |

The sodium lauryl sulfate and the sodium phosphate were dissolved in water and charged to the reactor. The reactor contents were placed under a nitrogen atmosphere. The reactor was charged with the monomers, and the contents of the reactor were heated to 60° C. and agitated with a mechanical stirrer. Polymerization was initiated by the sodium persulfate and was continued for 16 hours at 60° C.

After completion of the reaction, the polymer was recovered through freeze coagulation of the latex. The polymer was filtered, and was then stirred with excess methanol overnight to remove residual monomers. The polymer was filtered again and dried in a vacuum over for 24 hours at 60° C. The copolymer was obtained in a 60 percent yield. Its composition, as determined by gas chromatograph analysis of residual monomers and the yield, was 73 methyl methacrylate and 27 indene in weight percent.

20 parts by weight of the copolymer was mixed with 80 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT and other physical properties, as noted below:

The HDT of the blend was 75° C., the tensile strength was 10,230 psi, the flexural strength was 11,310 psi and the flexural modulus 401,000 psi. The melt index of the blend was 1.164 g./10 min at 175° C.

EXAMPLE 6

A copolymer was made by suspension polymerization according to the following recipe. Amounts are in weight parts per 100 parts of total monomers.

| PHM | Components |
|---|---|
| 150 | H₂O |
| 0.6 | 2,2'-azobis(2,4-dimethylvaleronitrile) |
| 0.2 | Hydroxylethylcellulose (suspending agent) |
| 31.5 | Acrylonitrile |
| 68.5 | Indene |

150 parts by weight of distilled water, 0.2 parts of HEC (which has been dissolved in water), 0.6 parts of 2,2'-azobis(2,4-dimethylvaleronitrile), 31.5 parts of Acrylonitrile, and 68.5 parts of indene were charged into a reactor provided with a stirrer. The reactor was purged with nitrogen, and was kept under nitrogen pressure. The temperature of the reactor was held for 5 minutes at 73° C. with stirring. The mixture was allowed to react for 16 more hours. After completion of the reaction, the polymer obtained was dissolved into acetone, and reprecipitated in excess methanol. The polymer was filtered and dried in a vacuum oven for 24 hrs at 60° C. A powdery copolymer was obtained in a 48.36 percent yield. The composition of the polymer in weight percent was 35.1 acrylonitrile and 64.9 indene as determined by N analysis.

25 parts by weight of the copolymer was mixed with 75 parts of extrusion grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties.

The HDT was 76° C., the tensile strength was 9,200 psi, the flexural strength was 12,000 psi and the flexural modulus 460,000 psi.

10 parts by weight of the copolymer was mixed with 90 parts of extrusion grade PVC and 3 parts of Thermolite 813 by a blender. The mixture was kneaded for 5 minutes with mixing a brabender having a surface temperature of 190° C. The resulting blend was press formed at 190° C. into a sheet, then a plaque. Each resin plaque thus prepared was tested for HDT, tensile strength and other physical properties.

The HDT was 75° C., the tensile strength was 10,100 psi, the flexural strength was 13,800 psi, the flexural modulus 450,000 psi and the notch izod was 0.53 ft-16/in.

EXAMPLE 7

A copolymer was made by suspension polymerization according to the following recipe. Amounts are in weight parts.

| PHM | Components |
|---|---|
| 150 | H₂O |
| 0.6 | 2,2'-azobis(2,4-dimethylvaleronitrile) |
| 0.2 | Hydroxylethylcellulose (suspending agent) |
| 31.5 | Acrylonitrile |
| 68.5 | Indene |
| 1.0 | Divinylbenzene |

150 parts by weight of distilled water, 0.2 parts of HEC (which has been dissolved in water), 0.2 parts of 2,2'-azobis(2,4-dimethylvaleronitrile), 31.5 parts of Acrylonitrile and 68.5 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile), 1.0 part of divinylbenzene and 10 mL of tetrahydrofuran was added continually into the reactor over a period of 11 hours through a syringe pump. The resulting mixture was further allowed to react for 5 more hours. After completion of the reaction, the polymer obtained was dissolved into acetone, and reprecipitated in excess methanol. The polymer was filtered and dried in a vacuum oven for 24 hrs at 60° C. A powdery copolymer was obtained in a 47.6 percent yield. The composition of the polymer in weight percent was 35.1 acrylonitrile and 64.9 indene as determined by N analysis.

25 parts by weight of the copolymer was mixed with 75 parts of extrusion grade PVC (inherent viscosity 0.92 deciliters/gm) and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties, as noted below:

The HDT was 77° C., the tensile strength was 8,800 psi, the flexural strength was 10,700 psi and the flexural modulus 530,000 psi.

EXAMPLE 8

A copolymer was made by suspension polymerization according to the following recipe. Amounts are in weight parts.

| PHM | Components |
|---|---|
| 150 | H₂O |
| 0.6 | 2,2'-azobis(2,4-dimethylvaleronitrile) |
| 0.2 | Hydroxylethylcellulose (suspending agent) |
| 31.5 | Acrylonitrile |
| 68.5 | Indene |
| 3.0 | Divinylbenzene |

150 parts by weight of distilled water, 0.2 parts of HEC (which has been dissolved in water), 0.2 parts of 2,2,'-azobis(2,4-dimethylvaleronitrile), 31.5 parts of Acrylonitrile and 68.5 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile), 3.0 parts of divinylbenzene and 8 mL tetrahydrofuran was added continually into the reactor over a period of 11 hours through a syringe pump. The resulting mixture was further allowed to react for 5 more hours. After completion of the reaction, the polymer obtained was dissolved into acetone, and reprecipitated in excess methanol. The polymer was filtered and dried in a vacuum oven for 24 hrs at 60° C. A powdery copolymer was obtained in a 44.8 percent yield. The composition of the polymer in weight percent was 35.1 acrylonitrile and 64.9 indene as determined by N-analysis.

25 parts by weight of the copolymer was mixed with 75 parts of extrusion grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties.

The HDT was 78.5° C., the tensile strength was 7,100 psi, the flexural strength was 10,500 psi and the flexural modulus 520,000 psi.

EXAMPLE 9

A copolymer was made by suspension polymerization according to the following recipe. Amounts are in weight parts per 100 parts of total monomers.

| PHM | Components |
|---|---|
| 150 | $H_2O$ |
| 0.6 | 2,2'-azobis(2,4-dimethylvaleronitrile) |
| 0.2 | Hydroxylethylcellulose (suspending agent) |
| 50 | Acrylonitrile |
| 50 | Indene |

150 parts by weight of distilled water, 0.2 parts of HEC (which has been dissolved in water), 0.2 parts of 2,2,'-azobis(2,4-dimethylvaleronitrile), 50 parts of Acrylonitrile and 9 parts of indene were charged into a reactor provided with a stirrer. The reactor was purged with nitrogen, and was kept under nitrogen pressure. The temperature of the reactor was held for 5 minutes at 71° C. with stirring; then a monomer mixture comprising 41 parts of indene was added continually into the reactor over a period of 8 hours through a syringe pump. During polymerization, the other 0.4 parts of 2,2,'-azobis(2,4-dimethylvaleronitrile) was added into the reactor in two equal portions; 0.2 parts at 2.5 hours and 0.2 parts at 5.0 hours. The resulting mixture was further allowed to react for 4 more hours. After completion of the reaction, the polymer obtained was dissolved into acetone, and reprecipitated in excess methanol. The polymer was filtered and dried in a vacuum oven for 24 hrs at 60° C. A powdery copolymer was obtained in a 57.7 percent yield. The composition of the polymer in weight percent was 48.1 acrylonitrile and 51.2 indene as determined by N-analysis.

25 parts by weight of the copolymer was mixed with 75 parts of extrusion grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties.

The HDT was 77° C., the tensile strength was 7,600 psi, the flexural strength was 9,200 psi and the flexural modulus 470,000 psi.

10 parts by weight of the copolymer was mixed with 90 parts of extrusion grade PVC and 3 parts of Thermolite 813 by a blender. The mixture was kneaded for 5 minutes with mixing a brabender having a surface temperature of 190° C. The resulting blend was press formed at 190° C. into a sheet, then a plaque. Each resin plaque thus prepared was tested for HDT, tensile strength and other physical properties.

The HDT was 74° C., the tensile strength was 10,100 psi, the flexural strength was 13,800 psi, the flexural modulus 460,000 psi.

EXAMPLE 10

A copolymer was made by suspension polymerization according to the following recipe. Amounts are in weight parts per 100 parts of total monomers.

| PHM | Components |
|---|---|
| 200 | $H_2O$ |
| 0.6 | 2,2'-azobis(2,4-dimethylvaleronitrile) |
| 0.2 | Hydroxylethylcellulose (suspending agent) |
| 60 | Acrylonitrile |
| 40 | Indene |

200 parts by weight of distilled water, 0.2 parts of HEC (which has been dissolved in water), 0.2 parts of 2,2,'-azobis(2,4-dimethylvaleronitrile), 60 parts of Acrylonitrile and 10 parts of indene were charged into a reactor provided with a stirrer. The reactor was purged with nitrogen, and was kept under nitrogen pressure. The temperature of the reactor was held for 5 minutes at 68° C. with stirring; then a monomer mixture comprising 30 parts of indene was added continually into the reactor over a period of 8.0 hours through a syringe pump. During polymerization, the other 0.4 parts of 2,2,'-azobis(2,4-dimethylvaleronitrile) was added into the reactor in two equal portions; 0.2 parts at 2.5 hours and 0.2 parts at 5.0 hours. The resulting mixture was further allowed to react for 2 more hours. After completion of the reaction, the polymer obtained was dissolved into acetone, and reprecipitated in excess methanol. The polymer was filtered and dried in a vacuum oven for 24 hrs at 60° C. A powdery copolymer was obtained in a 61 percent yield. The composition of the polymer in weight percent was 51.2 acrylonitrile and 49.8 indene as determined by N-analysis.

25 parts by weight of the copolymer was mixed with 75 parts of extrusion grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties.

The HDT was 77° C., the tensile strength was 7,300 psi, the flexural strength was 8,900 psi and the flexural modulus 450,000 psi.

10 parts by weight of the copolymer was mixed with 90 parts of extrusion grade PVC and 3 parts of Thermolite 813 by a blender. The mixture was kneaded for 5 minutes with mixing a brabender having a surface temperature of 190° C. The resulting blend was press formed at 190° C. into a sheet, then a plaque. Each resin plaque thus prepared was tested for HDT, tensile strength and other physical properties.

The HDT was 74° C., the tensile strength was 9,500 psi, the flexural strength was 13,400 psi, the flexural modulus 440,000 psi.

EXAMPLE 11

A copolymer was made by suspension polymerization according to the following recipe. Amounts are in weight parts per 100 parts of total monomers.

| PHM | Components |
|---|---|
| 300 | $H_2O$ |
| 0.6 | 2,2'-azobis(2,4-dimethylvaleronitrile) |
| 0.2 | Hydroxylethylcellulose (suspending agent) |
| 70 | Acrylonitrile |
| 30 | Indene |

300 parts by weight of distilled water, 0.2 parts of HEC (which has been dissolved in water), 0.2 parts of 2,2'-azobis(2,4-dimethylvaleronitrile), 70 parts of Acrylonitrile and 11.5 parts of indene were charged into a reactor provided with a stirrer. The reactor was purged with nitrogen, and was kept under nitrogen pressure. The temperature of the reactor was held for 5 minutes at 68° C. with stirring; then a monomer mixture comprising 18.5 parts of indene was added continually into the reactor over a period of 8 hours through a syringe pump. During polymerization, the other 0.4 parts of 2,2'-azobis(2,4-dimethylvaleronitrile) was added into the reactor in two equal portions; 0.2 parts at 2.5 hours and 0.2 parts at 5.0 hours. The resulting mixture was further allowed to react for 2 more hours. After completion of the reaction, the polymer obtained was dissolved into acetone, and reprecipitated in excess methanol. The polymer was filtered and dried in a vacuum oven for 24 hrs at 60° C. A powdery copolymer was obtained in a 63.05 percent yield. The composition of the polymer in weight percent was 58.2 acrylonitrile and 41.8 indene as determined by N-analysis.

25 parts by weight of the copolymer was mixed with 75 parts of extrusion grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties.

The HDT was 78° C., the tensile strength was 7,300 psi, the flexural strength was 9,900 psi and the flexural modulus 440,000 psi.

10 parts by weight of the copolymer was mixed with 90 parts of extrusion grade PVC and 3 parts of Thermolite 813 by a blender. The mixture was kneaded for 5 minutes with mixing a brabender having a surface temperature of 190° C. The resulting blend was press formed at 190° C. into a sheet, then a plaque. Each resin plaque thus prepared was tested for HDT, tensile strength and other physical properties.

The HDT was 75° C., the tensile strength was 9,200 psi, the flexural strength was 13,200 psi, the flexural modulus 450,000 psi.

EXAMPLE 12

A copolymer was made by bulk polymerization, as follows. 90 parts by weight methyl methacrylate, 10 parts by weight indene and 0.4 parts by weight 2,2,'-azobis(2,4-dimethylvaleronitrile) were charged into an ampule, purged with $N_2$, and the ampule was sealed and placed in a water bath at 60° C. and gently agitated for 68 hours. Then the polymer ampule was cooled, broken open, and the contents poured into MeOH. The yield ws 90 percent. The polymer composition was in weight percent 92 methyl methacrylate and 8 percent indene as determined by $C^{13}$ NMR.

When a blend is made with PVC as in Example 1, similar results are obtained, including a higher HDT and a higher melt index than without the 25 parts of copolymer.

EXAMPLE 13

A copolymer was made by emulsion polymerization using the following recipe. Amounts are in weight parts per 100 parts of total monomers.

| | |
|---|---|
| Water | 200 |
| Sodium Lauryl Sulfate | 2.5 |
| Sodium Phosphate 12 H$_2$O | 1.0 |
| Methyl Methacrylate | 40 |
| Indene | 60 |
| Sodium Persulfate | 1.0 |

The reactor was charged with the ingredients listed above, purged with nitrogen and sealed. The reactor was then mechanically agitated and heated to 60° C. for 24 hours. The polymer was recovered by freeze coagulation followed by washing with methanol and dried. The yield of polymer was 49 percent. The composition of the polymer was 77.5% methyl methacrylate and 22.5% indene, determined by $C^{13}$ NMR.

When a blend is made with PVC as in Example 5, similar results are obtained, including a higher HDT and a higher melt index than without the 25 parts of copolymer.

EXAMPLE 14

A copolymer was made by emulsion polymerization using the following recipe. Amounts are in weight parts per 100 parts of total monomers.

| | |
|---|---|
| Water | 200 |
| Sodium Lauryl Sulfate | 2.5 |
| Sodium Phosphate 12 H$_2$O | 1.0 |
| Methyl Methacrylate | 20 |
| Indene | 80 |
| Sodium Persulfate | 1.0 |

The reactor was charged with the ingredients listed above, purged with nitrogen and sealed. The reactor was then mechanically agitated and heated to 60° C. for 24 hours. The polymer was recovered by freeze coagulation followed by washing with methanol and dried. The yield of polymer was 24 percent. The composition of the polymer was 70% methyl methacrylate and 30% indene, determined by $C^{13}$ NMR.

As will be evident to those skilled in the art, various modifications of this invention can be made or followed in the light of the foregoing disclosure and discussion without departing from the spirit and scope of the disclosure or from the scope of the claims.

We claim:

1. A composition comprising an intimate admixture of (a) 50 to 98 parts by weight of a vinyl chloride polymer having an inherent viscosity of at least 0.4 and (b) 50 to 2 parts by weight of an addition copolymer containing indene and one comonomer selected from acrylonitrile, methyl methacrylate and methacrylonitrile, combined in the polymer structure with indene in the amount of 31.5–70 acrylonitrile, or 37–80 methacrylonitrile, or 46–95 methyl methacrylate, all per 100 parts by weight of indene plus comonomer combined in the polymer structure.

2. A composition of claim 1 wherein the addition polymer of the blend contains combined in its structure 0.01 to 3 parts by weight, per 100 parts by weight of indene and said selected comonomer in the addition polymer structure, of a cross-linking agent having a plurality of $CH_2=C<$ groupings.

3. A composition of claim 1 wherein said comonomer is acrylonitrile.

4. A composition of claim 1 wherein said comonomer is methacrylonitrile.

5. A composition of claim 1 wherein said comonomer is methyl methacrylate.

6. A composition of claim 2 wherein said comonomer is methyl methacrylate.

* * * * *